United States Patent Office 3,561,296
Patented Feb. 9, 1971

3,561,296
HYDRAULIC CONTROL SYSTEM FOR AUTOMATIC TRANSMISSION
Tetsuya Iijima, Tokyo, Japan, assignor to Nissan Jidosha Kabushiki Kaisha, Yokohama, Japan
Filed Nov. 29, 1968, Ser. No. 779,927
Claims priority, application Japan, Dec. 19, 1967, 42/80,978
Int. Cl. B60k 21/10
U.S. Cl. 74—869         3 Claims

ABSTRACT OF THE DISCLOSURE

A hydraulic control system for automatic transmission mechanism for a vehicle to remedy shock engagement of the clutch or brake upon starting the vehicle which provides a valve means to introduce fluid pressure to pressure regulator valve to reduce line pressure which is only effective at low speed low engine torque conditions.

---

Figure 1:
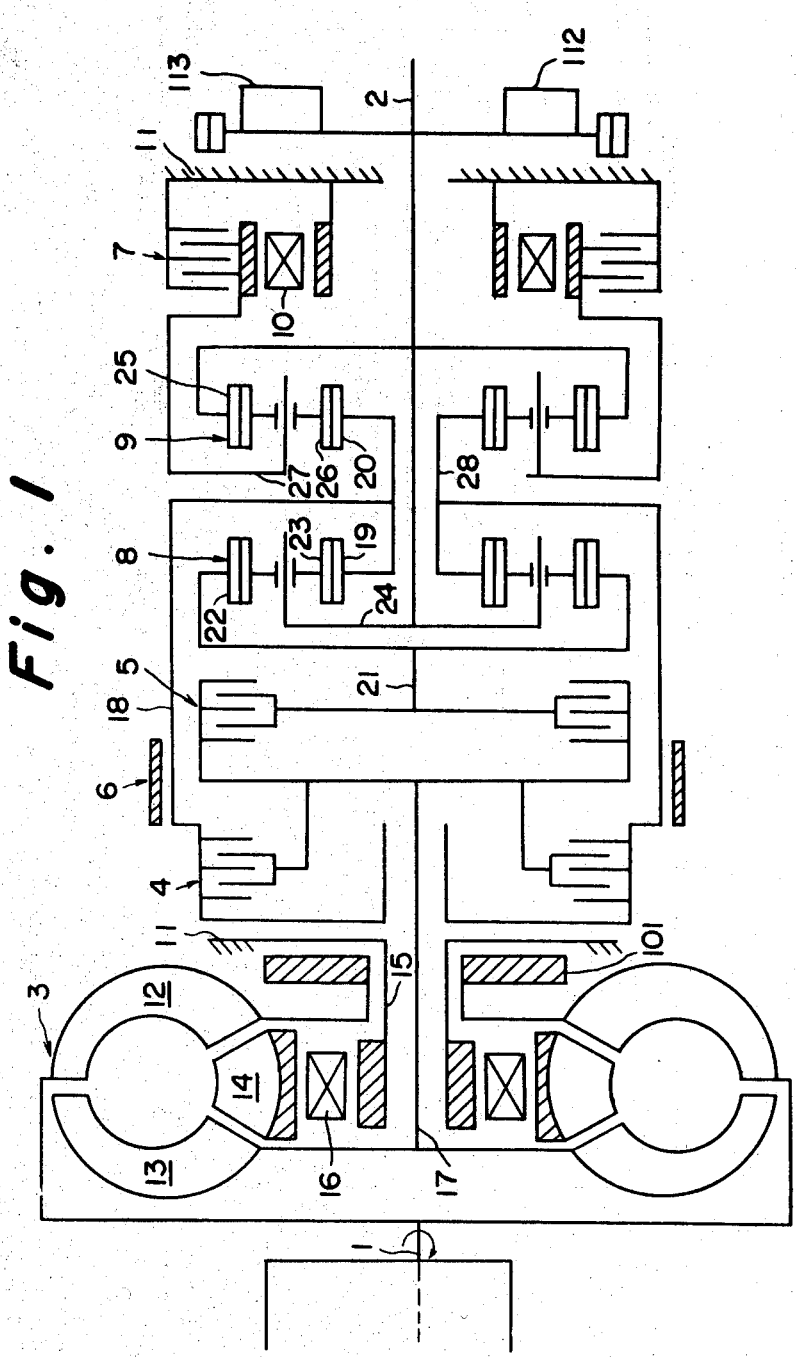

The present invention relates generally to a control system for multiple speed ratio power transmission mechanisms, and more particularly to a hydraulic control system for an automatic transmission of a vehicle.

Automatic transmission mechanisms having planetary gear units usually include a plurality of friction elements, such as friction clutches and friction brakes, to provide a plurality of gear ratios by selectively engaging or releasing the friction elements. To attain a smooth shift between the gear ratios, hydraulic control systems are provided to detect engine output and vehicle speed and to change the capacity of the friction elements by regulating the actuating hydraulic pressure corresponding to the detected values.

The torque of the friction elements, i.e. transmission torque of the friction clutch and braking torque of the friction brake must be changed in accordance with engine loads and the vehicle speeds. The necessary torque capacity increases as the engine load increases, and must be relatively large at starting or low speed and relatively small at higher speed. In the specification and claims, "friction clutch" means engageable and disengageable means to connect or disconnect torque transmission between rotatable members, "friction brake" means engageable and disengageable means to clamp or release a rotatable member to a stationary portion of the transmission mechanism, and "friction elements" includes such friction clutches and/or friction brakes.

When the torque capacity of such friction elements is too small compared to the necessary torque capacity at that time, a slipping between the members to be clamped to each other will be too much and result in inaccurate operation or overspeed of the engine. When the torque capacity of the friction element is too large, the clutch or brake will engage instantaneously and result in severe shock. As the torque capacity depends on hydraulic pressure which actuates a hydraulic piston operating the friction element, by controlling the hydraulic pressure so as to minimize the difference between the torque capacity of the friction element and the necessary torque to be transmitted or braked, a smooth shift operation can be attained without too much slipping and without any uncomfortable shock.

In some known vehicles, an uncomfortable shock occurs when the manual shift lever is shifted from neutral position to forward or reverse position. The shock results from the fact that, ordinary hydraulic control system are designed to provide sufficiently high hydraulic pressure to accommodate the necessary torque capacity of the friction element while running the vehicle and cannot be low enough to accommodate the necessary low torque capacity required while the vehicle is stationary and the engine is in an idling condition.

Accordingly an object of the present invention is to provide an improved hydraulic control system having hydraulic pressure regulating means to actuate friction elements to attain smooth shift of the automatic transmission mechanism.

A primary object of the present invention is to provide an improved hydraulic control system producing no uncomfortable shock by shifting at a stationary and low speed low throttle condition, such as shifting from neutral to forward or rearward position.

According to the present invention, an improved small hydraulic pressure regulator valve means is included in the hydraulic control system, so as to reduce the hydraulic pressure to accomodate the necessary torque capacity of the friction element at stationary and low speed low throttle condition without any shock or excess slipping, and further, the hydraulic pressure is not reduced by the valve means at a high speed high throttle condition.

Figure 2:
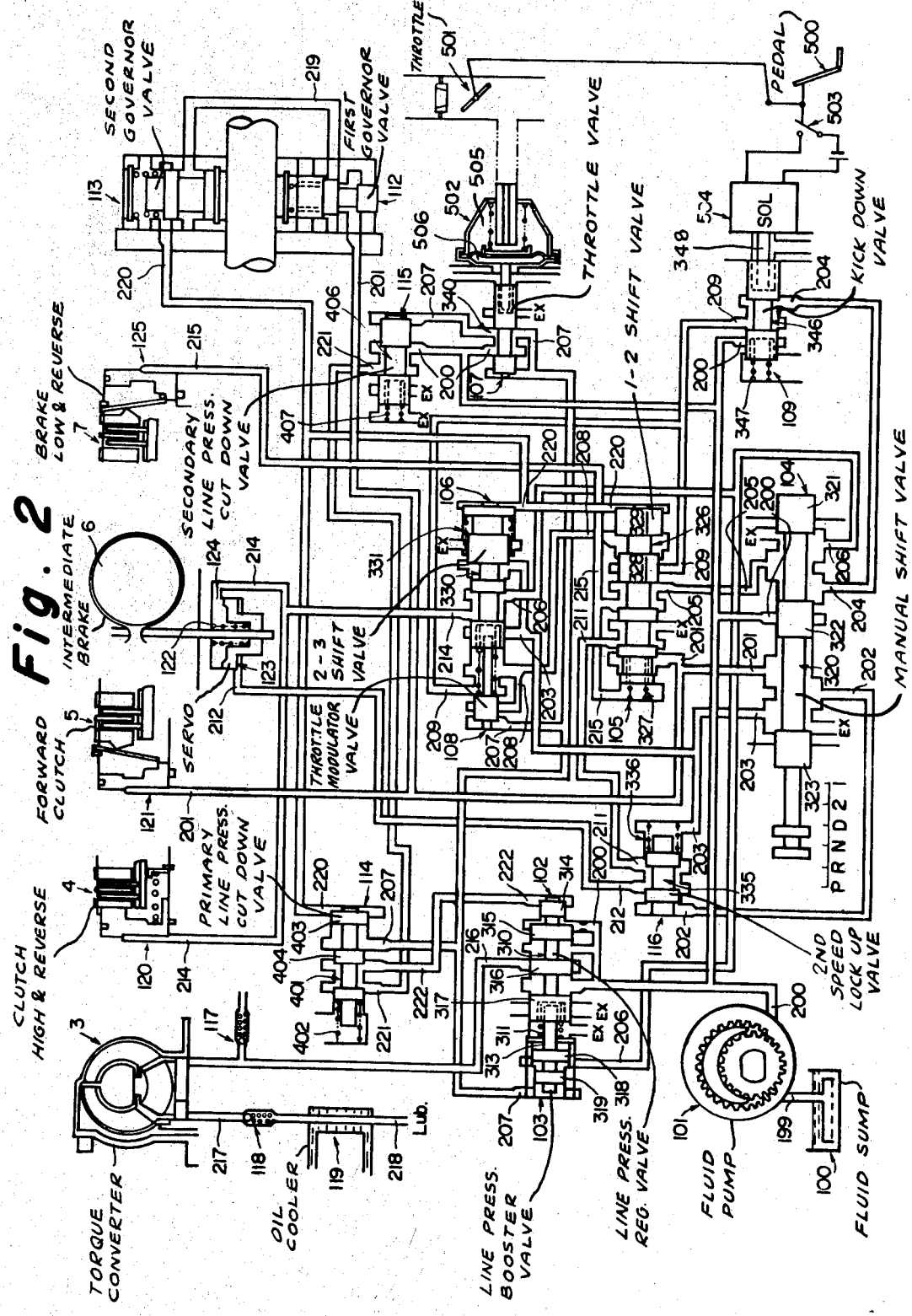
Figure 3:
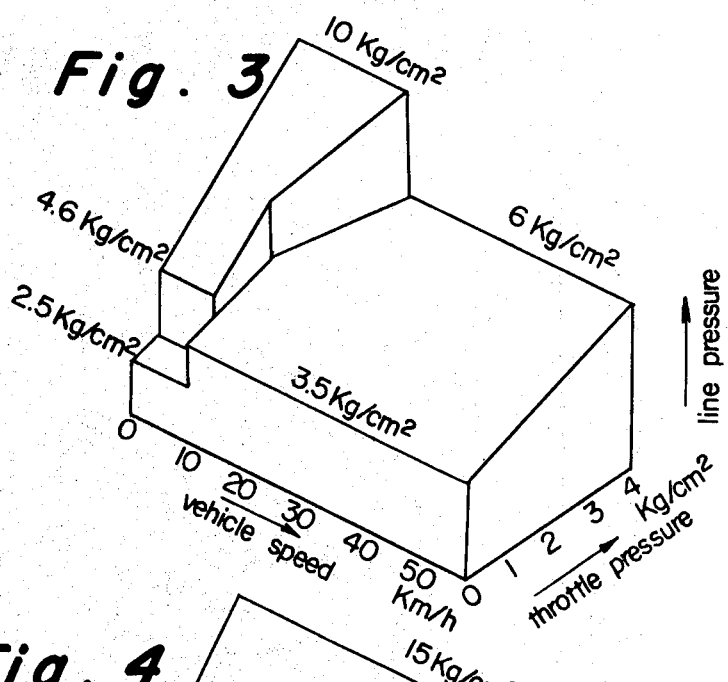
Figure 4:
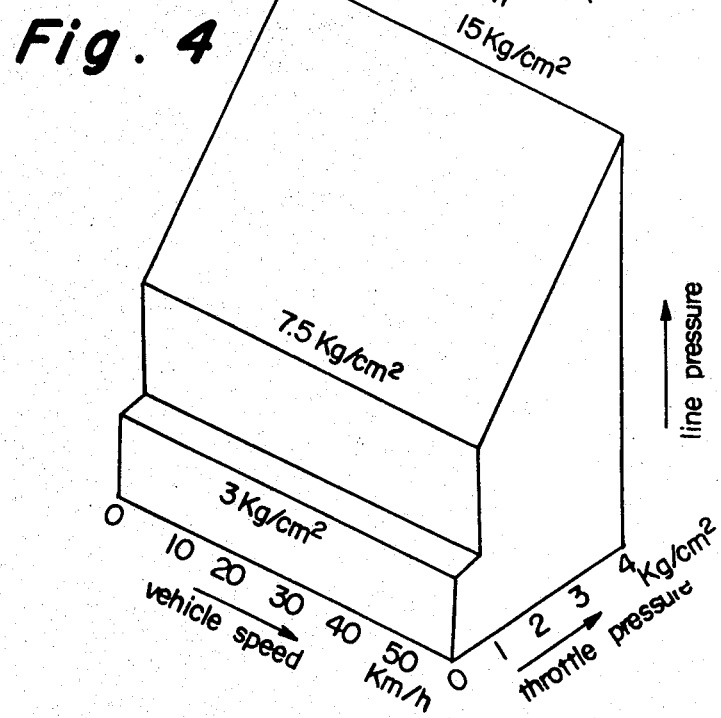

Further and more specific objects, features and advantages of the present invention and the manner in which the invention is carried into practice are made apparent in the following detailed description of preferred embodiments, by way of example, wherein reference is made to the accompanying drawing, in which:

FIG. 1 shows a diagrammatic illustration of a power transmission mechanism of an automatic transmission of a vehicle, FIG. 2 shows a diagram of one embodiment of a hydraulic control system, according to the invention, to control the transmission shown in FIG. 1, FIG. 3 shows a characteristic diagram of hydraulic pressure at "D" and 1st speed ratio of "1" range, and FIG. 4 shows a characteristic diagram of hydraulic pressure at "R" range.

In the drawing, the same reference numerals are used to indicate similar parts for the sake of clarity.

FIG. 1 shows in a schematic form a typical power transmission mechanism providing a three element torque converter unit and two planetary gear units. While this is used as an example to describe the invention, it will be understood that the present invention has application to any apparatus comprising a torque converter or a hydraulic coupling unit and a plurality of planetary gear units and providing a hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one-way brake 10 and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one-way clutch 16, and is filled with working fluid transmitting the driving torque. The power transmitted by the engine drive shaft 1 through the impeller 12 and the working fluid to the turbine 13 is transmitted through an intermediate shaft 17 which is connected to the turbine 13 to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A pluarlity of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only to the direction of the input shaft 1 indicated by an arrow. The friction brake 6 clamps, by tightening to the drum 18, the sun gear 19 and 20 through a hollow transmission shaft 28.

The transmission mechanism shown in FIG. 1 provides three forward and one reverse speed ratios by suitable engagement of the friction elements as shown in Table 1.

TABLE 1

| Speeds | Gear ratio | Friction elements engaged | | | | |
|---|---|---|---|---|---|---|
| | | Clutch 4 | Clutch 5 | Brake 6 | Brake 7 | One-way brake 10 |
| 1st | 2.45 | — | o | — | — | o |
| 2nd | 1.45 | — | o | o | — | — |
| 3rd | 1.00 | o | o | — | — | — |
| 1st (manual low) | 2.45 | — | o | — | o | o |
| Reverse | 2.18 | o | — | — | o | — |

NOTE.—"o" shows engagement of the friction element or locking of the one-way brake; and "—" shows disengagement of free relative rotations thereof.

In FIG. 1, no hydraulic control system actuating the friction elements are shown, however, a few of the functional members are shown. These are an engine driven fluid pump 101 and a governor valve assembly 112 and 113 which is connected to the output shaft 2.

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, the fluid pump 101, a line pressure regulator valve 102, a a line pressure booster valve 103, a manual shift valve 104, a 1-2 shift valve 105, a 2-3 shift valve 106, a throttle valve 107, a throttle modulator valve 108, a kickdown valve 109, a first governor valve 112, a second governor valve 113, a primary line pressure cut-down valve 114, a secondary line pressure cut-down valve 115, a 2nd speed lock-up valve 116, a torque converter relief valve 117, and a torque converter check valve 118 to effect desired automatic shifting between the above mentioned speed ratios by introducing predetermined line pressure to the friction elements. The control system further includes a torque converter oil cooler 119, a hydraulic servo 120 to engage the friction clutch 4 by introducing hydraulic pressure to the servo 120, a hydraulic servo 121 to operate the friction clutch 5, a hydraulic servo 122 to operate the friction brake 6, the hydraulic servo 122 having an engage side brake chamber 123 and a release side brake chamber 124 servo, a hydraulic servo 125 to operate the friction brake 7, and also as control components, an accelerator pedal 500, a carburetor throttle valve 501, a vacuum diaphragm unit 502, a kick-down switch 503 to actuate the throttle valve 107 and a kick-down solenoid 504, and further, actuating and controlling conduits and passages properly connecting the valves and components to provide desired hydraulic control of automatic transmission.

As a single hydraulic pressure source, operating fluid of the hydraulic control system, working fluid of the torque converter 3 and lubricant fluid of the transmission mechanism are delivered by the positive displacement fluid pump 101 which is driven by the engine as shown in FIG. 1 and is adapted to draw fluid from the sump 100 through suction line 199 and to supply fluid under pressure to the above mentioned components through passage 200. The fluid pressure in the passage 200 is main source of the hydraulic circuit and is mentioned as line pressure.

The line pressure through passage 200 is regulated by the line pressure regulator valve assembly 102 and 103 as will be described more fully hereinafter. Fluid under pressure which is supplied to the torque converter 3 from the passage 200 through the pressure regulator valve 102 and passage 216 is regulated by the torque converter relief valve 117 which prevents fluid pressure from increasing beyond a predetermined value. Fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operated by the vehicle operator to introduce line pressure in the passage 200 to passages 201 through 206 as shown in Table 2, according to the selected positions of the shift lever not shown.

TABLE 2

| | Selected position | | | | | |
|---|---|---|---|---|---|---|
| | P | R | N | D | 2 | 1 |
| Passage: | | | | | | |
| 201 | — | — | — | o | o | o |
| 202 | — | — | — | o | o | — |
| 203 | — | — | — | o | — | — |
| 204 | o | o | — | — | o | o |
| 205 | o | o | — | — | — | o |
| 206 | — | o | — | — | — | — |

NOTE.—"o" shows communication of the passage to line pressure at the selected position; and "—" shows communication to an exhaust port at the selected position. The operation of the power transmission mechanism shown in Fig. 1 according to the selected positions P, R, N, D, 2 and 1 will be as follows:
P: The output shaft 2 is locked by a locking device not shown,
R: Reverse drive,
N: Neutral, power is not transmitted to output shaft 2,
D: Forward drive, the transmission shown is shifted automatically between 1st, 2nd, and 3rd speed ratios,
2: Lock to 2nd speed ratio,
1: Down shift from 2nd to 1st speed ratio and maintaining to 1st speed ratio.

The manual shift valve spool 320 is shown in the neutral or N position in FIG. 2, thus blocking all operating passages from line pressure and communicates them to exhaust ports Ex which communicate to the sump 100 through passages not shown.

When the operator shifts the manual shift valve 104 to the automatic three speeds forward position D, passages 201, 202 and 203 communicate to the line pressure passage 200. The line pressure supplied through passage 201 actuates the hydraulic servo 121 to engage the friction clutch 5 all through the three speeds forward drive. Further, passage 201 communicates to the 1-2 shift valve 105 and the first governor valve 112. The line pressure through the passage 203 is supplied to the 2-3 shift valve 106.

The 1-2 shift valve 105 comprises a valve spool 326 which is biased by a spring 327 to keep the valve spool 326 in the rightward position as shown in FIG. 2 at 1st speed ratio and blocks the passage 201 from communication anywhere. Thus only the friction clutch 5 is engaged, the vehicle drives forward at 1st speed ratio as shown in Table 1 due to the engagement of the one-way brake 10. In this case, as one-way brake 10 is effective, the engine drives the wheels, but the wheels cannot drive the engine, so that an engine braking function is not effective owing to free rotation of the one-way brake 10. As the vehicle speed increases governor pressure produced by the governor valve assembly 112 and 113, as will be explained more in detail hereinafter, through passage 220 urges the valve spool 326 leftward, so that passage 201 communicates to passage 211 to apply the engage side chamber 123 of the hydraulic servo 122 of the friction brake 6, thus the friction brake 6 is engaged to attain 2nd speed ratio of the power transmission mechanism as shown in Table 1.

The 2-3 shift valve 106 comprises a valve spool 330 which is biased to rightward position as shown in FIG. 2 by a spring 331 at 1st and 2nd speed ratios. As the vehicle speed further increases, governor pressure through passage 220 is increased sufficiently to urge the valve spool 330 leftward to communicate passage 203 to passage 214 through a groove of the valve spool 330. Line pressure through passage 214 is supplied to the hydraulic servo 120 to engage the friction clutch 4 and also to the release side chamber 124 of the hydraulic servo 122 to release the friction brake 6. By providing an area difference between the chambers 124 and 123, the friction brake is released when both chambers 124 and 123 are supplied with line pressure, so that a smooth shift process between the 2nd and 3rd speed ratios is attained. Thus, as shown in Table 1, the power transmission mechanism shown in FIG. 1 is driven in 3rd speed ratio or direct coupling.

When the operator selects the position "2" by shifting the manual shift valve 104, line pressure through passage 200 is supplied to passages 201, 202 and 204. Line pressure through passage 201, as in selected position D, engages the friction clutch 5.

The 2nd speed lock-up valve 116 comprises a valve spool 335 which is biased to the leftward position as shown in FIG. 2 by a spring 336 when passages 202 and 203 are both communicated to either line pressure or to an exhaust port, so that passages 211 and 212 are communicated with each other. Thus when passage 211 is communicated to line pressure, the pressure is supplied to engage side chamber 123 of the hydraulic servo 122 to engage the friction brake 6. When the position "2" is selected, passage 202 communicates to line pressure and passage 203 communicates to an exhaust port. Thus the valve spool 335 is urged rightward to communicate passage 202 to passage 212 so that line pressure is supplied to the engage side chamber 123 of the hydraulic servo 122 to engage the friction brake 6. Thus 2nd speed ratio is attained. The valve spool 335 is maintained in the rightward position throughout the selected position "2" and is not effected by vehicle operating conditions such as speed or throttle opening.

When the operator selects the position "1" by shifting the manual shift valve 104, line pressure through passage 200 is communicated to passages 201, 204 and 205. As before, line pressure through passage 201 acts to engage the friction clutch 5 all through the position "1." Line pressure through passage 205 communicates to passage 215 when the 1-2 shift valve 105 is in the rightward position as shown in FIG. 2, so that the line pressure actuates the hydraulic servo 125 to engage the friction brake 7, thus 1st speed ratio is obtained. If the 1-2 shift valve 105 is kept leftward by governor pressure through passage 220 due to the vehicle speed, when the manual shift lever is moved to the position "1" from other positions, passage 201 communicates through passage 211, the 2nd speed lock-up valve 116 and passage 212 to the engage side chamber 123 of the hydraulic servo 122 to engage the friction brake 6. Thus 2nd speed ratio is attained. In the position "1," passages 203 and 206 are exhausted so that 3rd speed ratio cannot be attained because the friction clutch 4 is not engaged. Thus, if the vehicle is operating in third or second speed ratio when the operator selects the position "1," the vehicle will be driven at second speed until the vehicle speed is reduced to a point where the governor pressure in line 220 is overcome by spring 327. When the 1-2 shift valve 105 is urged rightward, 1st speed ratio is attained as before, and line pressure through passage 215 urges the valve spool 326 from the left end surface, so that 1st speed ratio is maintained to prevent upshifting. In this case, as the friction brake 7 is engaged, the planet carrier 27 of the rear planetary gear unit 9 is clamped against rotation in both directions, compared to the one-way brake 10 in case of 1st speed ratio of the position D, so that an engine braking function can be obtained.

When the manual shift valve 104 is shifted to reverse drive position R, line pressure through passage 200 is supplied to passages 204, 205 and 206. Line pressure through passage 205 is applied to engage the friction brake 7 as before, and line pressure through passage 206 is communicated through the 2-3 shift valve 106 and passage 214 to the hydraulic servo 120 to engage the friction clutch 4. Thus, as shown Table 1, the output shaft 2 of the power transmission mechanism rotates in the reverse direction.

The governor valve assembly 112 and 113 is mounted to the output shaft 2 of the power transmission as shown in FIG. 1 and adapted to supply hydraulic pressure representing the vehicle speed to passage 220. The governor valve may be of any construction representing the vehicle speed. In the illustrated embodiment, line pressure through passage 201 is introduced in the first governor valve 112 which is constructed as as pressure regulator valve to produce increasing hydraulic pressure as a function to increasing rotational speed of the output shaft 2. The pressure which is determined by equilibrium between centrifugal force, spring bias pressure and hydraulic pressure is supplied through passage 219 to the second governor valve 113 constructed as a change-over valve and adapted to supply fluid pressure beyond a predetermined speed of the output shaft 2 of the vehicle to the passage 220. The governor pressure through passage 220 is supplied to the 1-2 shift valve 105 and the 2-3 shift valve 106 to urge the valve spools 326 and 330 leftward respectively, as described before, when the vehicle speed exceeds respective predetermined values, so that communication passages of the line pressure are changed to effect automatic shifting between 1st through 3rd speed ratios. Also, the passage 220 is communicated to the right end surface of spool 401 of the primary line pressure cut-down valve 114 to regulate hydraulic pressure actuating the friction elements as will be explained in more detail hereinafter.

The kick-down valve 109 comprises a valve spool 346 which is biased a rightward position by a spring 347 to block communication between passages 200 and 209. Engaging the right end surface of the spool 346, the kick-down solenoid 504 is provided. As the accelerator pedal 500 is depressed, the kick-down switch 503 is closed to energize the solenoid 504 and actuate rod 348 to urge the valve spool 346 leftward, so that line pressure through passage 200 communicates to passage 209. Fluid pressure through passage 209 operates on the area difference between lands 328 and 329 to urge the spool 326 rightward when the spool 326 is shifted leftward. Also, the passage 209 communicates to the left end surface of the spool 330 of the 2-3 shift valve 106 to urge the spool 330 rightward. Consequently, the valve spool 330 or 326 will move rightward when the urging force overcomes the biasing force of the governor pressure through passage 220, so that a down-shift from 3rd to 2nd or from 2nd to 1st speed ratio will be obtained.

To detect the engine torque, throttle opening or vacuum pressure in intake manifold of the engine may be available. In the illustrated embodiment, the engine torque is detected by vacuum pressure in the engine intake manifold. In the general gasoline engine, the engine torque is higher as vacuum pressure in the intake manifold is lower. To detect the engine torque the vacuum pressure diaphragm unit 502 is provided to engage the right end surface of the throttle valve 107, and when pressure in vacuum chamber 505 of the vacuum diaphragm unit 502 is equal to atmospheric pressure in chamber 506, throttle valve spool 340 is urged leftward, and also, as the vacuum is increased in the chamber 505 the biasing pressure to the spool 349 is decreased. The throttle valve 107 regulates the line pressure through passage 200 by leaking a portion thereof to an exhaust port to produce a hydraulic pressure representing the urging force of the vacuum diaphragm unit 502 and also representing the engine torque to passage 207. The throttle pressure through passage 207 is supplied to left end surfaces of the line pressure booster valve 103 and the throttle modulator valve 108 which is combined with the 2-3 shift valve 106 and to the right end surface of the secondary line pressure cut-down valve 115 so that the valve spools are biased to regulate shift point or to regulate line pressure through passage 200.

The line pressure regulator valve assembly 102 and 103 consists of the line pressure regulator valve 102 comprising a spool 310 and a biasing spring 311 and the pressure booster valve 103 comprising a spool 313 which is assembled in line with the spool 310. Fluid pressure produced due to the oil pump 101 is introduced through passage 200 between lands 314 and 315 of the spool 310 and urges the spool 310 leftward by the area difference between the lands 314 and 315 against the biasing spring 311. When the fluid pressure through passage 200 is higher than a predetermined value, the spool 310 is urged leftward to open communication between passages 200 and 216 and supply torque converter working fluid as previously mentioned. When the fluid pressure is further increased, the spool 310 moves further leftward and land 317 thereof opens to an exhaust port to leak a portion of fluid and to reduce the hydraulic pressure in the passage 200. Thus, a equilibrium is produced between the urging force and the biasing spring force, and consequently, the fluid pressure in passage 200 is regulated to a desired line pressure.

The line pressure booster valve biases the spool 310 of the regulator valve 102 by the spool 313 when fluid pressure is applied to the left end surface of land 319 through passage 207, or to the area difference between lands 318 and 319 through passage 206, so that line pressure increases to attain equilibrium between the forces. On the contrary, when fluid pressure is applied to right end surface of the spool 310 of the regulator valve 102 through passage 222 to urge the spool 310 leftward, the regulated line pressure through passage 200 is decreased correspondingly to attain equilibrium again.

The primary line pressure cut-down valve 114 comprises a valve spool 401 and a biasing spring 402. Governor pressure through passage 220 is applied to right end surface of land 403 of the spool 401 to urge the spool 401 leftward against the spring force, and throttle pressure through passage 207 is applied to the area difference between lands 403 and 404 to urge the spool 401 rightward. Thus, when the force produced by governor pressure is larger than the force produced by the spring 402 and throttle pressure, spool 401 is urged leftward to communicate passages 207 and 222, and when governor pressure is lower, spool 401 is at the rightward position as shown in FIG. 2 to communicate passages 222 and 221. Consequently, when the governor pressure is sufficiently high, throttle pressure through passage 207 is applied to both end surfaces of the line pressure regulator valve assembly 102 and 103 and as the land 314 is smaller than the land 319, the urging force of the throttle pressure on the line pressure regulator valve assembly 102 and 103 acts from left to right to move spool 313 rightwardly. Consequently, line pressure increases as throttle pressure or engine torque increases.

The secondary line pressure cut-down valve 115, according to one embodiment of the present invention comprises a valve spool 406 and a biasing spring 407, and communicates through passage 221 to the primary cut-down valve 114, through passage 200 to the line pressure, and through passage 207 to the throttle pressure which is applied to the right end surface of the spool 406.

When the spool 406 is biased rightward as shown in FIG. 2, passages 200 and 221 are communicated with each other. When the first cut-down valve 114 is at the right end position, corresponding to low governor pressure through passage 220, passages 221 and 222 are communicated to apply line pressure to the right end surface of the pressure regulator valve 102, so that line pressure is reduced. When throttle pressure through passage 207 is increased, the valve spool 406 of the secondary cut-down valve is urged leftward against biasing spring 407, passage 200 is blocked passage 221 is communicated to exhaust port so that fluid pressure applied to the right end surface of the pressure regulator valve 102 decreases stepwise resulting in a stepwise increase of line pressure. The graphical representation of the line pressure in relation to the vehicle speed and the throttle pressure, at forward drive position, i.e. when passage 201 is communicated to line pressure to apply governor pressure through passage 220 is shown in FIG. 3 in which, vehicle speed, throttle pressure and hydraulic pressure are shown as an illustrative representation. As shown in FIG. 3, when both vehicle speed and throttle pressure are low, line pressure is applied through passage 221 and 222 to the right end surface of the pressure regulator valve 102 so that line pressure through passage 200 is reduced to a desired low value corresponding to necessary torque to engage friction elements to start the vehicle without any uncomfortable shock.

When the vehicle speed is low, the governor pressure is low enough to keep the valve spool 401 of the primary cut-down valve 114 to in the illustrated right end position, and when the throttle pressure is high enough to urge the valve spool 406 of the secondary cut-down valve 115 leftward, the passage 221 is exhausted, so that fluid pressure through passage 222 which is applied to the right end surface of the pressure regulator valve 102 is reduced resulting in a stepwise increase of line pressure and line pressure increases as increase of throttle pressure which is applied to left end surface of the pressure booster valve 103, as shown in the left portion of FIG. 3.

When the vehicle speed is increased, governor pressure is also increased sufficiently to urge the valve spool 401 of the primary cut-down valve 114 leftward against the forces of spring 402 and throttle pressure which is applied to the area difference between lands 403 and 404, and passages 222 and 207 are communicated and passage 221 is blocked from communication anywhere. Thus to both ends of the pressure regulator valve assembly 102 and 103 the same throttle pressure through passage 207 is applied, and line pressure is decreased stepwise as shown in the right hand portion of FIG. 3 corresponding to the necessary torque capacity of the friction elements which is to be engaged at higher speed. As the land 319 of the pressure booster valve 103 is larger than the land 314 of the pressure regulator valve 102 line pressure increases gradually as the throttle pressure increases.

FIG. 4 is a graphical illustration of line pressure at reverse drive position in relation to vehicle speed and throttle pressure. As shown in Table 2, passages 204, 205 and 206 communicate to line pressure through passage 200 and passage 201 is exhausted, so that no fluid pressure is produced in passage 220. Thus, the valve spool 401 of the primary cut-down valve 114 is maintained in the illustrated right end position to communicate passages 221 and 222. As before, when throttle pressure through passage 207 is low enough passage 221 is communicated to line pressure through passage 200 to apply line pressure to the right end surface of the pressure regulator valve 102 resulting in a stepwise reduction of the line pressure as shown in the front portion of FIG. 4.

As the throttle pressure increases to urge the valve spool 406 of the secondary cut-down valve 115 leftward, passage 200 is blocked and passage 221 is exhausted as before, so that fluid pressure applied to the right end surface of the pressure regulator valve 102 is reduced stepwise resulting in a stepwise increase of line pressure. Further, passage 206 which communicates to line pressure at position R communicates between area difference lands 318 and 319 of the pressure booster valve 103 to bias the spool 312 rightward so that line pressure increases more steeply compared to FIG. 3 as throttle pressure increases.

In the illustrated embodiment the secondary cut-down valve 115 is shown as a change over valve, however, a similar line pressure decreasing effect is obtained by constructing the secondary cut-down valve as a pressure regulator valve to introduce regulated fluid pressure when the throttle pressure is below a predetermined value.

It will be appreciated that by providing the secondary cut-down valve 115 according to the present invention to hydraulic control system of the automatic transmission, a desired high fluid pressure is applied to the pressure regulator valve at low speed and low throttle operating conditions of the vehicle, so that line pressure is reduced to accommodate the necessary low torque capacity to engage the friction elements to start the vehicle both forward and rearward without any uncomfortable shock.

While the illustrated power transmission mechanism and the hydraulic control system is used as an example to illustrate the invention, it will be understood that the invention has application to any transmission and hydraulic control system to effect engagement of friction elements to attain automatic shifting between speed ratios.

What is claimed is:

1. A hydraulic control system for an automatic transmission mechanism for vehicles, said transmission including an input shaft and an output shaft, at least one planetary gear unit disposed between said shafts, a plurality of friction elements connected to said planetary gear unit for obtaining a plurality of gear ratios by selectively engaging said friction elements by hydraulic pressure produced in said hydraulic control system, said hydraulic control system comprising, a fluid pump for producing line pressure, line pressure passage means for distributing said line pressure, a line pressure regulator valve connected to said line pressure passage means for controlling the line pressure produced by said pump, a manual shift valve means connected to said line pressure passage means for selectively obtaining a plurality of forward gear ratios and a reverse gear ratio, throttle valve means connected to said line pressure passage means for producing a throttle pressure signal representing engine torque, governor valve means connected to said line pressure passage means for producing a governor pressure signal representing vehicle speed, first and second valve means, throttle pressure passage means communicating said throttle valve means with said first and second valve means, governor pressure passage means communicating said governor valve means with said first valve means, first passage means communicating said first valve means with said line pressure regulator valve for decreasing line pressure as a function of fluid pressure in said first passage means, a second passage means communicating said first valve means with said second valve means, said second valve means having an exhaust port therein, whereby, upon the introduction of governor pressure to said first valve means above a predetermined value said throttle pressure passage means is communicated with said first passage means and upon the introduction of throttle pressure to said second valve means above a predetermined value said second passage means is communicated to said exhaust port so that the line pressure is reduced to its lowest value at a low speed and low engine torque operating condition of the vehicle.

2. A hydraulic control system as claimed in claim 1, further comprising a third passage means communicating said line pressure passage means with said second valve means, whereby when the throttle pressure in said throttle pressure passage means and the governor pressure in said governor pressure passage means are below predetermined values, said third passage means is communicated to said second passage means by said second valve means and said second passage means is communicated with said first passage means by said first valve means to apply line pressure to said line pressure regulator valve for reducing said line pressure to its lowest value.

3. A hydraulic control system as claimed in claim 2 further comprising, a passage means connecting said manual shift valve with said line pressure regulator valve, whereby line pressure is introduced to said passage means for increasing said line pressure when said manual shift valve is placed in a reverse gear ratio position.

References Cited
UNITED STATES PATENTS

| | | | |
|---|---|---|---|
| 3,310,991 | 3/1967 | Leonard | 74—869X |
| 3,362,261 | 1/1968 | Snyder et al. | 74—869X |
| 3,393,585 | 7/1968 | Pierce, Jr. | 74—869X |
| 3,446,098 | 5/1969 | Searles | 74—869 |

ARTHUR T. McKEON, Primary Examiner